United States Patent
Lee (10) Patent No.: US 7,308,619 B2
(45) Date of Patent: Dec. 11, 2007

(54) IP PACKET ERROR HANDLING APPARATUS AND METHOD USING THE SAME, AND COMPUTER READABLE MEDIUM HAVING COMPUTER PROGRAM FOR EXECUTING THE METHOD RECORDED THEREON

(75) Inventor: Min-jae Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 576 days.

(21) Appl. No.: 10/983,663

(22) Filed: Nov. 9, 2004

(65) Prior Publication Data
US 2005/0149829 A1    Jul. 7, 2005

(30) Foreign Application Priority Data
Dec. 2, 2003    (KR)  ............ 10-2003-0086753

(51) Int. Cl.
    *H04L 29/02*    (2006.01)
    *H03M 13/47*    (2006.01)
(52) U.S. Cl. ............... 714/704; 714/776; 726/2
(58) Field of Classification Search ............ 714/704, 714/776; 726/2
See application file for complete search history.

(56) References Cited

U.S. PATENT DOCUMENTS

| | | | |
|---|---|---|---|
| 7,120,847 B2 * | 10/2006 | Kostoff et al. ............ | 714/776 |
| 2003/0048793 A1 | 3/2003 | Pochon et al. | |
| 2003/0188015 A1 | 10/2003 | Lee et al. | |
| 2005/0039104 A1 * | 2/2005 | Shah et al. ............ | 714/776 |

FOREIGN PATENT DOCUMENTS

| | | |
|---|---|---|
| JP | 11-68837 A | 3/1999 |
| JP | 2000-261477 A | 9/2000 |
| KR | 2002-0034281 A | 5/2002 |

OTHER PUBLICATIONS

Node (networking)—Wikipedia, the free encyclopedia; Sep. 21, 2004; 1 page; URL: http://web.archive.org/web/20041126054127/http://en.wikipedia.org/wiki/Node_(networking).*

* cited by examiner

*Primary Examiner*—R. Stephen Dildine
(74) *Attorney, Agent, or Firm*—Sughrue Mion Pllc.

(57) ABSTRACT

An error handling apparatus and method, and a computer-readable medium storing a computer program for executing the error handling method are provided. According to the method, in a case where a number of errors in object IP packets that are consecutively detected, each within a first predetermined time since a previous error detection, exceeds a maximum allowable number of errors, communication with a sending node of the erroneous IP packets during a second predetermined time is discontinued. Also, errors can be handled with reference to a cache unit including more than one entry identified by an address of a corresponding erroneous IP packet. Therefore, a network load of a receiving node can be reduced by not transmitting an internet control message protocol (ICMP) packet to a sending node where indiscriminate IP packet manipulations or denial of service (DoS) attacks are suspected during the second predetermined time.

20 Claims, 8 Drawing Sheets

IP PACKET ERROR HANDLING APPARATUS AND METHOD USING THE SAME, AND COMPUTER READABLE MEDIUM HAVING COMPUTER PROGRAM FOR EXECUTING THE METHOD RECORDED THEREON

This application claims the priority of Korean Patent Application No. 2003-86753, filed on Dec. 2, 2003, in the Korean Intellectual Property Office, the disclosure of which is incorporated herein in its entirety by reference.

BACKGROUND OF THE INVENTION

1. Field of the Invention

The present invention relates to a technology for detecting and handling an internet protocol (IP) packet error, and more particularly, to IP packet error handling technology, which can reduce a network load by generating an internet control message protocol (ICMP) cache for recording information concerning an IP packet field error and by discontinuing IP packet communication under certain conditions.

2. Description of the Related Art

An ICMP, which controls messages between a sending end and a receiving end and informs of an error, is defined in RFC-792 and operates in a network layer of the OSI 7-layer with an IP. Therefore, in a case where an error is generated in an IP packet received at a receiving end, reliability of the IP packet is guaranteed by re-transmitting an ICMP message embedded in the IP packet to a sending end and letting the sending end take necessary measures according to the generated error.

Figure 1A:
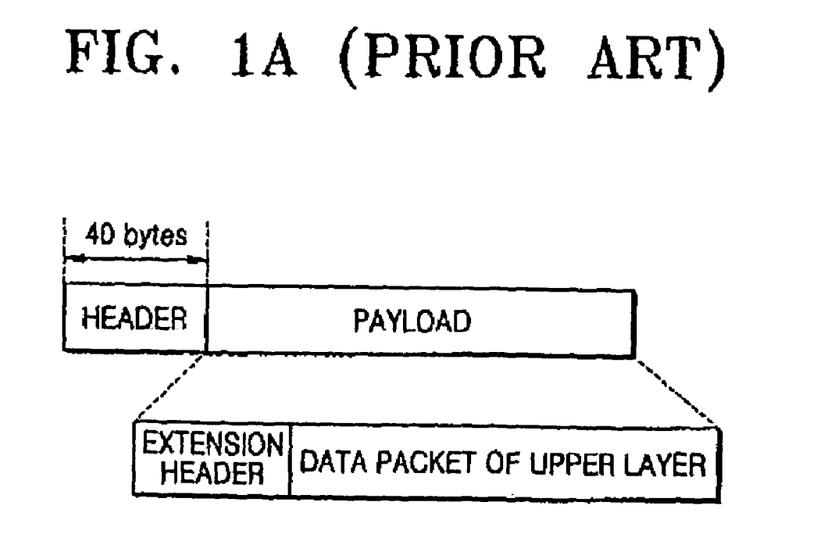
FIGS. 1A and 1B illustrate the configuration of an IPv6 packet.
Figure 1B:
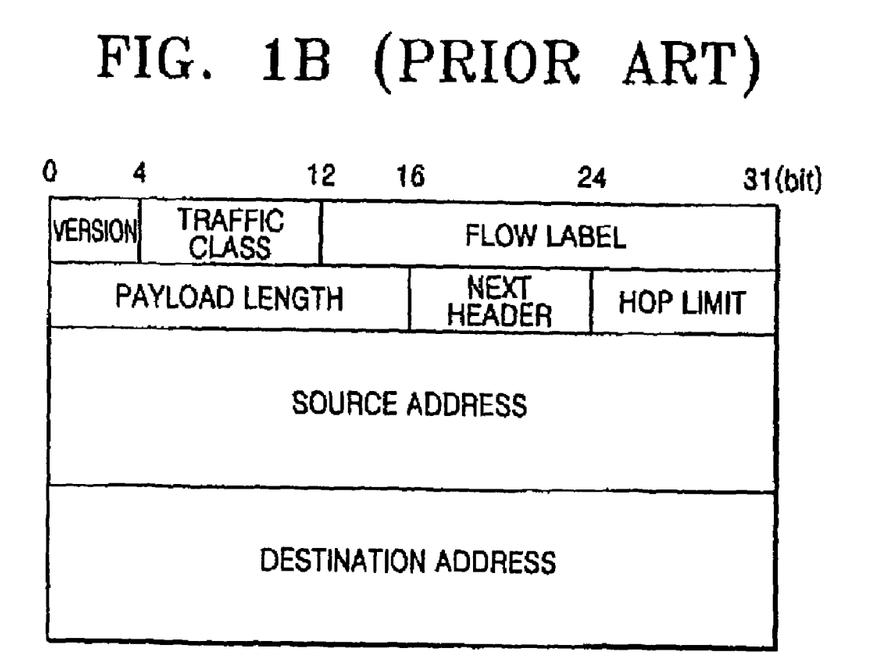

Due to the ongoing expansion of the Internet, differentiation requests in packet delivery according to new audio and video service patterns have occurred, and in the near future, new Internet addresses under a 32-bit addressing system of Internet Protocol version 4 (IPv4) will no longer be allowed. Thus, Internet Protocol version 6 (IPv6) using a 128-bit addressing system has appeared. FIG. 1A shows the configuration of an IPv6 packet, and FIG. 1B shows the configuration of a header of the IPv6 packet. The IPv6 packet consists of a basic header and a payload, and the payload consists of an extension header and an upper layer data packet such as a Transmission Control Protocol (TCP) packet and a User Datagram Protocol (UDP) packet. The basic header consists of 40 bytes of data, 32 bytes assigned to an IPv6 address and 8 bytes assigned to six fields. Among the six fields, a next header field identifies the kind of information of a data field immediately following the basic header. Also, the extension header in the payload includes a next header field that identifies the kind of information of a data field immediately following the extension header, and an option field, which identifies a type of the extension header.

Internet Control Message Protocol version 6 (ICMPv6) is a multi-purpose protocol for transferring an error message and an information message between IPv6 nodes. The ICMPv6 has been simplified by integrating Internet Control Message Protocol version 4 (ICMPv4), Internet Group Membership Protocol (IGMP), Address Resolution Protocol (ARP), and Reverse ARP (RARP), which had been scattered across a network layer, and removing a message type which was nearly unused in the ICMP.

An ICMPv6 message is transmitted by attaching it to an IPv6 packet and is identified by the value 58 in a next header field of the IPv6 header. Hereinafter, the IPv6 and the ICMPv6 are represented by IP and ICMP, respectively, unless otherwise specified.

Figure 2A:
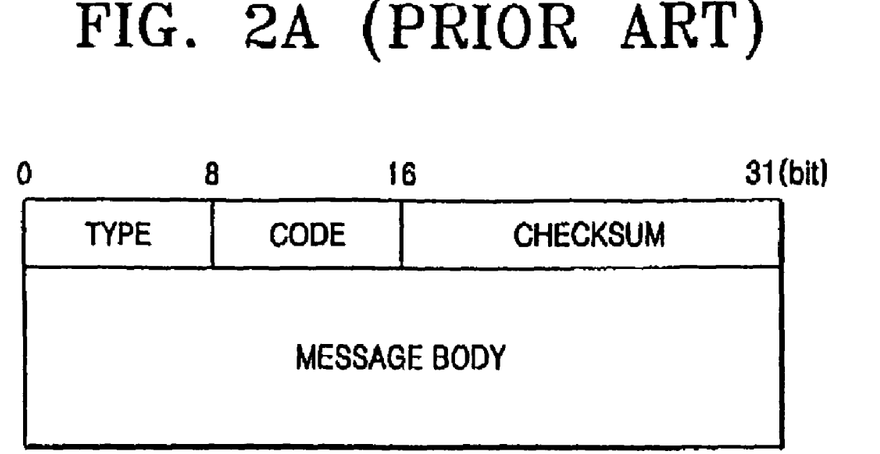
FIGS. 2A and 2B illustrate the configuration of an ICMPv6 message packet.

FIG. 2A shows the format of a general ICMP message packet. An 8-bit type field represents a message type. If the most significant bit of the type field is 0, that is, if a type field value is 0-127, the message type is an error message, and if the most significant bit of the type field is 1, the message type is an information message. For example, a type field value 4 represents a parameter problem message generated in a case where a problem is discovered in a basic header field or an extension header field of an IP packet, and type field values 128 and 129 represent an echo request message and an echo reply message, respectively, used for performing a ping to judge whether an ICMP message packet can reach a target node.

An 8-bit code field represents detailed items of an ICMP message determined in the type field. For example, according to values of the code field, the parameter problem message is divided into a header field problem (code field value=0), an unrecognized next header (code field value=1), and an unrecognized IPv6 option (code field value=2).

A 16-bit checksum field is used for detecting an ICMP message error and partially an IP message error.

Figure 2B:
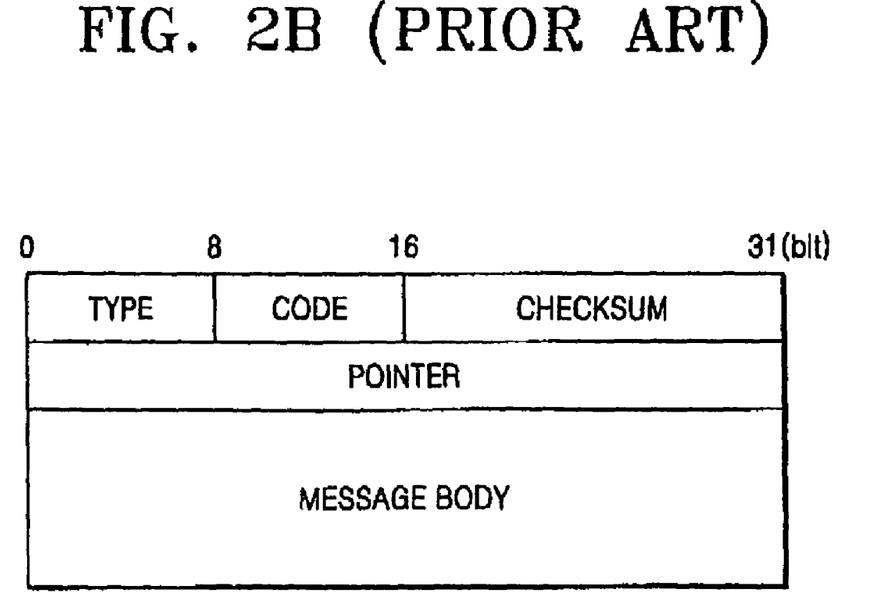

A message body is changed according to a message type determined in the type field. A message body of the parameter problem message is formed as shown in FIG. 2B. A pointer field identifies a position where an error is detected in an original message. Also, the message body lets a sending end take necessary measures to deal with an IP packet in which an error has been generated, by placing an IP packet that has caused generation of an ICMP message, following the pointer field.

Figure 3:
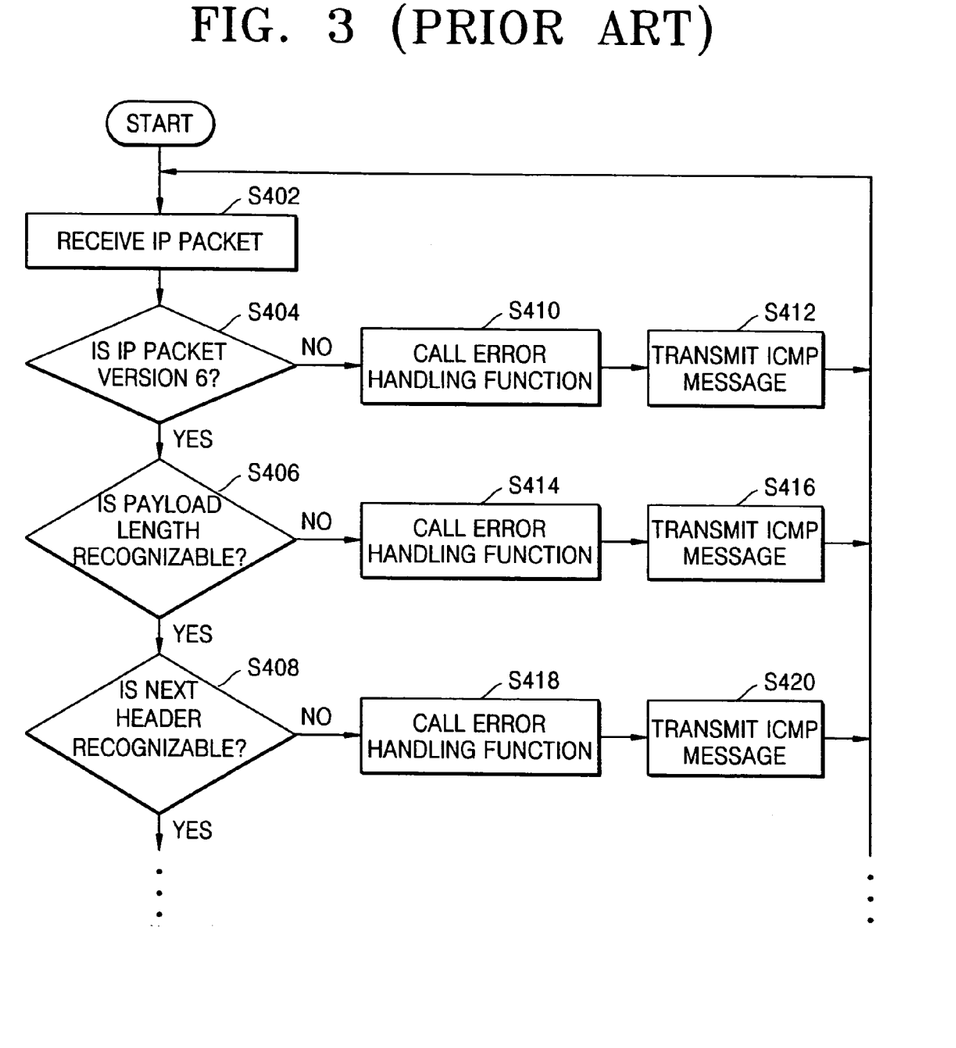
FIG. 3 is a flowchart of a conventional IP packet error handling method.

FIG. 3 is a flowchart of a conventional method of handling a field error of an IP packet header, the method including the steps of receiving an IP packet at a receiving end, detecting an error from fields of the header, and transmitting an ICMP message to a sending end. When the receiving end receives an IP packet in step S402, a version field of a basic header of the IP packet is checked to determine whether the version of the IP packet is 6. If the version of the IP packet is not 6, an error handling function is called in step S410 to generate an ICMP message packet. The generated ICMP message packet is transmitted in step S412 to the sending end. In the same way, field values of the basic header of the IP packet are checked in steps S406 and S408 to determine whether the field values of the basic header are recognized values. If the field values of the basic header are not recognized values, the error handling function is called in steps S414 and S418 to generate ICMP message packets. The generated ICMP message packets are transmitted in steps S416 and S420 to the sending end. At this time, if an extension header exists, error detection is also performed for a next header field and an option field of the extension header. ICMP message packets are transmitted to the sending end in the same way. In addition, whenever an unreachable destination error, a packet too big error, or a time exceeded error is detected, a relevant ICMP message packet can be transmitted to the sending end.

Until now, since a relevant ICMP message packet has been repeatedly re-transmitted whenever an error was generated in a received IP packet, if a malicious user broke into a network and manipulated IP packets or tried a denial of service (DoS) attack, or if a serious problem in a path shared by more than two nodes occurred, it was difficult to evade the problems.

The reason is that since an ICMP message packet is a type of IP packet in which an ICMP message is added to an original IP packet, the size of the ICMP message packet is much larger than usual. Therefore, if ICMP message packets are re-transmitted to the sending end whenever intentionally manipulated packets are generated, the network becomes overloaded rendering normal communication impossible.

SUMMARY OF THE INVENTION

Exemplary embodiments of the present invention provide a method, an apparatus, and a computer program for reducing a network load of a receiving node by not transmitting ICMP packets to a sending node in a case where a number of consecutively generated IP packet errors detected in a predetermined time exceeds a predetermined number.

Other exemplary embodiments of the present invention provides a method, an apparatus, and a computer program for reducing a network load of a receiving node and improving communication efficiency by not transmitting ICMP packets to a sending node of problematic IP packets in a case where a number of consecutively generated erroneous IP packets having the same source address detected in a predetermined time exceeds a predetermined number of times.

According to an exemplary embodiment of the present invention, there is provided an IP packet error handling apparatus, which handles errors in IP packets received from at least one sending node, the apparatus comprising: an error detector, which detects errors from the received IP packets; and an error handler, which discontinues communication with a sending node of the erroneous IP packets during a second predetermined time in a case where a number of errors in object IP packets that are consecutively detected, each within a first predetermined time since a previous error detection, exceeds a maximum allowable number of errors.

In another exemplary embodiment of the present invention, the error handler handles errors in IP packets having the same address information.

According to another exemplary embodiment of the present invention, there is provided an IP packet error handling apparatus, which handles errors in IP packets received from at least one sending node, the apparatus comprising: an error detector, which detects errors in the received IP packets; and an error handler, which discontinues communication with a sending node of the erroneous IP packets during a second predetermined time in a case where more than a predetermined number of errors in IP packets are detected during a first predetermined time.

According to another exemplary embodiment of the present invention, there is provided an IP packet error handling method, which handles errors in IP packets received from at least one sending node, the method comprising: (a) detecting errors in the received IP packets; and (b) discontinuing communication with a sending node of the erroneous IP packets during a second predetermined time in a case where a number of errors in object IP packets that are consecutively detected, each within a first predetermined time since a previous error detection, exceeds a maximum allowable number of errors.

In another exemplary embodiment of the present invention, step (b) is performed for IP packets having the same address information.

In another exemplary embodiment of the present invention, in a case where no error is detected in step (a), the method further comprises (c) handling the received IP packets normally.

In another exemplary embodiment of the present invention, step (b) further comprises (b1) generating a cache, which consists of at least one entry comprising: a first timer field, which is set to the first predetermined time and decreases linearly with time; a second timer field, which is set to the second predetermined time and decreases linearly with time; an error count field, which counts the number of consecutively generated errors; and an address information field, which represents address information of an erroneous IP packet, and matches IP packets having the same address information to the same entry, wherein step (b) is performed with reference to an entry associated with erroneous object IP packets having the same address information.

In another exemplary embodiment of the present invention, step (b) further comprises: (b2) searching for the associated entry in the cache; (b3) checking statuses of fields of the associated entry; (b4) in a case where it is found in step (b3) that the number of errors in object IP packets that are consecutively detected, each within the first predetermined time since the previous error detection, exceeds the maximum allowable number of errors, setting a second timer field of the associated entry to the second predetermined time and subtracting from the second timer field linearly with time; and (b5) in a case where it is found in step (b3) that the second predetermined time tracked by the second timer field has not lapsed, not transmitting an ICMP packet to a sending node of the object IP packet.

In another exemplary embodiment of the present invention, step (b) further comprises (b6) generating a new entry associated with the object IP packet in a case where the associated entry was not found in step (b2).

In another exemplary embodiment of the present invention, step (b) further comprises (b6) in a case where it is found in step (b3) that the first timer field of the associated entry is 0, deleting the associated entry.

In another exemplary embodiment of the present invention, step (b) further comprises (b6) in a case where it is found in step (b3) that the first timer field of the associated entry is 0, setting the first timer field to the first predetermined time and subtracting from the first timer field linearly with time.

In another exemplary embodiment of the present invention, statuses of the second timer field, the first timer field, and the error count field of the associated entry are sequentially determined in step (b3).

In another exemplary embodiment of the present invention, step (b) further comprises (b6) in a case where it is found in step (b3) that the second timer field of the associated entry is 0, the first timer field of the associated entry is not 0, and the error count field of the associated entry has not reached the maximum allowable number of errors, adding 1 to the error count field of the associated entry, setting the first timer field to the first predetermined time, and subtracting from the first timer field linearly with time.

In another exemplary embodiment of the present invention, the entry further comprises a valid bit field for representing whether the entry is used.

In another exemplary embodiment of the present invention, the entry further comprises an ICMP type field and an ICMP code field for respectively representing an ICMP type and an ICMP code defined in an ICMP to transmit ICMP packets to a sending node of erroneous IP packets.

In another exemplary embodiment of the present invention, the address information field comprises a source address field and a destination address field for respectively representing source address information and destination address information of an erroneous IP packet.

In another exemplary embodiment of the present invention, in step (b), whenever the next error is detected and the first timer field of the associated entry is not 0, the error count field of the associated entry is increased by 1 and the first timer field is simultaneously set to the first predetermined time and subtracted from linearly with time, and in a case where the error count field exceeds the maximum allowable number of errors, the second timer field of the associated entry is set to the second predetermined time and subtracted from linearly with time, and in a case where an error is detected in the object IP packet received while the second timer field is not 0, an ICMP packet about the error is not transmitted to a sending node of the object IP packet.

According to an exemplary embodiment of the present invention, there is provided an IP packet error handling method, which handles errors in IP packets received from at least one sending node, the method comprising: (a) detecting errors in the received IP packets; and (b) discontinuing communication with a sending node of the erroneous IP packets during a second predetermined time in a case where more than a predetermined number of errors in the IP packets are detected during a first predetermined time.

According to another exemplary embodiment of the present invention, there is provided a computer-readable medium having recorded thereon a computer program for executing a method, which handles errors in IP packets received from at least one sending node, the method comprising: (a) detecting errors in the received IP packets; and (b) discontinuing communication with a sending node of the erroneous IP packets during a second predetermined time in a case where a number of errors in object IP packets that are consecutively detected, each within a first predetermined time since a previous error detection, exceeds a maximum allowable number of errors.

According to another exemplary embodiment of the present invention, there is provided a computer-readable medium having recorded thereon a computer program for executing a method, which handles errors in IP packets received from at least one sending node, the method comprising: (a) detecting errors in the received IP packets; and (b) discontinuing communication with a sending node of the erroneous IP packets during a second predetermined time in a case where more than a predetermined number of errors in the IP packets are detected during a first predetermined time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE ILLUSTRATIVE, NON-LIMITING EMBODIMENTS OF THE INVENTION

An exemplary embodiment of the present invention will now be described with reference to the attached drawings.

Figure 4:
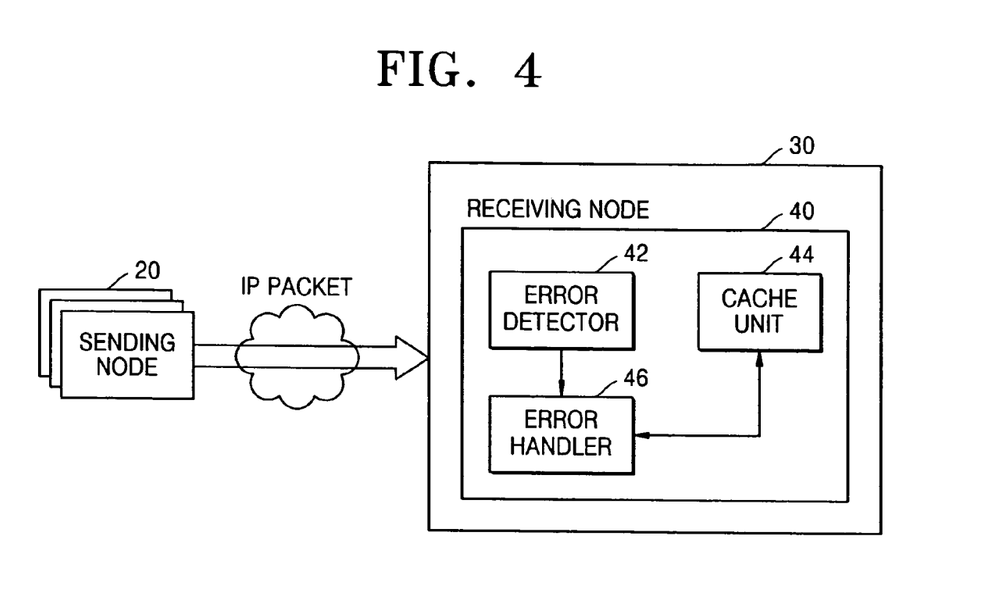
FIG. 4 is a block diagram of an IP packet error handling apparatus according to an embodiment of the present invention.

An error handling apparatus 40 according to an exemplary embodiment of the present invention is shown in FIG. 4. The error handling apparatus 40 includes an error detector 42, a cache unit 44, and an error handler 46. The error handling apparatus 40 can be realized as one chip inside a receiving node 30, and a router setting communication paths can be included in the receiving node 30.

The error detector 42 detects errors of a plurality of IP packets received from at least one sending node 20 and transfers the result together with relevant IP packets to the error handler 46. The error detector 42 also detects errors of fields of headers of IP packets including unreachable destination errors, packet too big errors, and time exceeded errors. The IP packet header field errors also include IP packet version errors, payload length errors, and unrecognized next header errors.

The cache unit 44 includes more than one entry having a plurality of fields representing error-related information of an erroneous IP packet and supplies information required for handling errors to the error handler 46.

Figure 5:
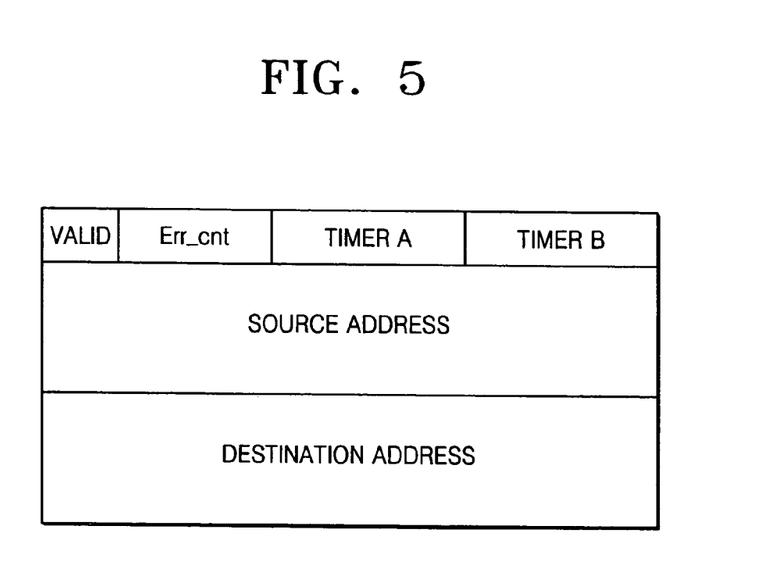
FIG. 5 is an example of the configuration of an entry forming a cache unit according to an embodiment of the present invention.

An example of the configuration of an entry is shown in FIG. 5. The entry includes a valid bit field (VALID) which represents with 0 or 1 whether the entry is used, an error count field (Err_cnt) which counts the number of error detections, a first timer field which is set to a maximum error detection waiting time and subtracted every unit time, a second timer field which is set to a maximum communication discontinuation time and subtracted every unit time, an address information field which represents address information of an erroneous IP packet.

According to FIG. 5, the address information field of the entry includes a source address (SA) information field and a destination address (DA) information field. However, in a case where the receiving node 30 has only one global address, the DA field can be omitted from the entry. Also, the valid bit field (VALID) is referred to for searching only entries in use when entries are searched. To improve system performance, the valid bit field (VALID) can be omitted from the entry. On the other hand, an ICMP error type field (not shown) and an ICMP error code field (not shown), which respectively represent an ICMP error type and an ICMP error code defined in an ICMP, can be added to the entry to refer to when an ICMP packet is generated and transmitted to the sending node 20 in an error handling process due to an erroneous IP packet.

With reference to the cache unit 44, according to an error detection result from the error detector 42, the error handler 46 deletes or updates a relevant entry, discards a relevant IP packet, handles the relevant IP packet in the normal manner, or generates an ICMP packet and transmits the ICMP packet to the sending node 20. In more detail, in a case where erroneous IP packets all have the same address information, and errors in the IP packets are consecutively detected within the maximum error waiting time until a maximum allowable number of errors is exceeded, the error handler 46 then handles the errors by discontinuing communication with a sending node of the erroneous IP packets during the maximum communication discontinuation time. Here, IP packets having the same address information means that SA information included in headers of the IP packets is the same and DA information included in the headers of the IP packets is the same.

Figure 6:
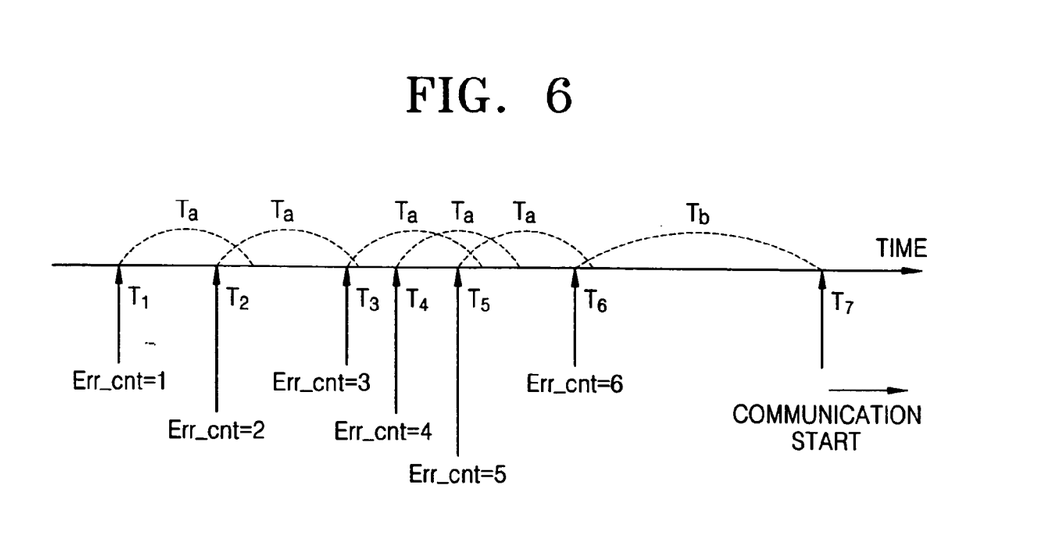
FIG. 6 is a timing diagram of an error handling process according to an embodiment of the present invention.

FIG. 6 is a timing diagram illustrating an error handling process of the error handler 46. Now, it is assumed that the maximum allowable number of errors Ecm is 5. When a first error is detected at a time T1, the error handler 46 sets the error count field (Err_cnt) to 1, sets the first timer field (Timer A) to a maximum error detection waiting time (Ta), and subtracts from the first timer field (Timer A) every unit time. When a second error is detected at a time T2 within the maximum error detection waiting time (Ta) after the time T1, the error handler 46 adds 1 to the error count field (Err_cnt), resets the first timer field (Timer A) to the maximum error detection waiting time (Ta), and subtracts from the first timer field (Timer A) every unit time. Since a sixth error, which exceeds the maximum allowable number of errors (Ecm=5), is generated within the maximum error detection waiting time (Ta) after a time T5, the error handler 46 discontinues communication with the sending node 20 during a maximum communication discontinuation time (Tb).

The error handler 46 lets the sending node 20 take necessary measures to deal with errors by transmitting relevant ICMP packets to the sending node 20 whenever the errors are detected before the communication is discontinued. For example, in a case where the sending node 20 receives more than a predetermined number of ICMP packets from the receiving node 30 within a predetermined time, it is assumed that a malicious attack on the IP packets is being carried out. Accordingly, necessary action such as seeking another router path can be taken.

Also, while the communication is discontinued, the receiving node 30 actually continues to receive IP packets from the sending node 20. However, the receiving node 30 discards erroneous IP packets without transmitting relevant ICMP packets to the sending node 20. Therefore, since the ICMP packets are not transmitted when an abnormal number of IP packet errors are generated, a network load of a receiving node can be reduced.

Figure 7:
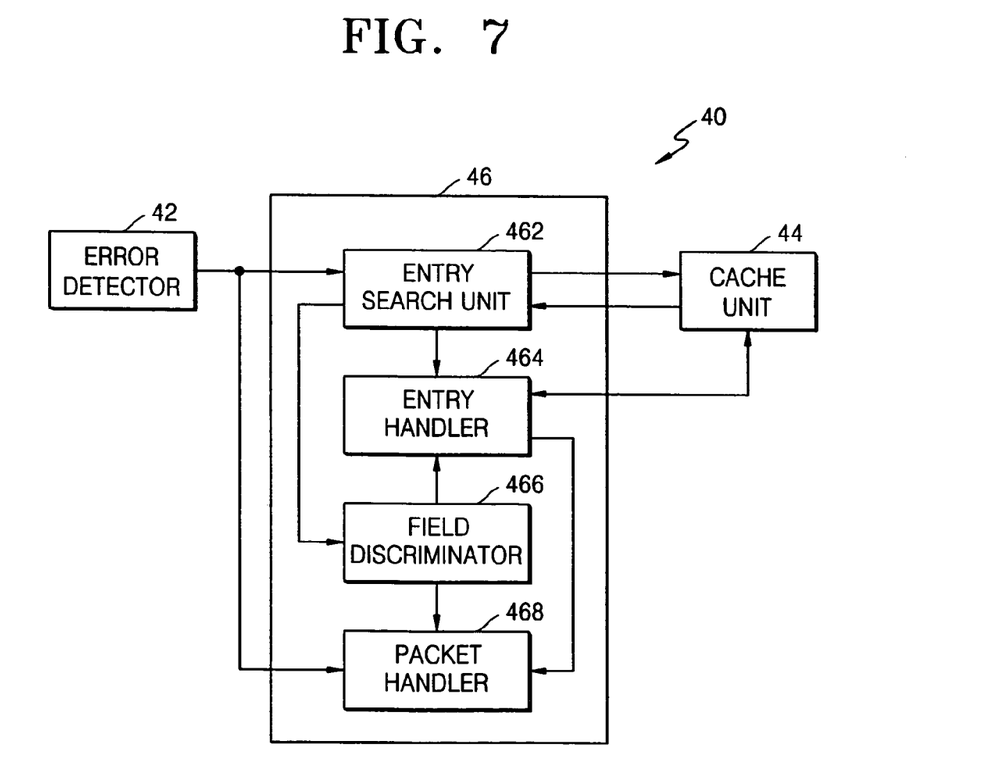
FIG. 7 is a block diagram of an internal configuration of an error handling apparatus of FIG. 4.

FIG. 7 is a diagram of the error handling apparatus 40 of FIG. 4 in which the configuration of the error handler 46 is shown in detail. The error handler 46 includes an entry search unit 462, an entry handler 464, a field discriminator 466, and a packet handler 468.

When the error detector 42 detects an error, it transmits address information of the erroneous IP packet together with an error detection signal to the entry search unit 462 and transmits the erroneous IP packet to the packet handler 468. When the error detector 42 fails to detect an error, it transmits a relevant IP packet together with an error detection failure signal to the packet handler 468.

The entry search unit 462 receives the address information of the erroneous IP packet with the error detection signal from the error detector 42 and searches the cache unit 44 for an entry including an address information field representing the address information of the erroneous IP packet. When the entry search unit 462 finds a matching entry, it transmits the entry to the field discriminator 466. When the entry search unit 462 does not find a matching entry, it transmits an entry generation request signal to the entry handler 464.

The entry handler 464 generates a new entry according to the entry generation request signal transmitted from the entry search unit 462 and stores the new entry in the cache unit 44. Also, the entry handler 464 deletes or updates a relevant entry according to the search result of the field discriminator 466 and transmits an ICMP packet transmission request signal to the packet handler 468.

The field discriminator 466 judges whether fields of the relevant entry transmitted from the entry search unit 462 satisfy a predetermined condition. According to the result, the field discriminator 466 transmits a packet discard request signal to the packet handler 468 or an entry request signal to the entry handler 464.

The packet handler 468 generates an ICMP packet about the relevant error in response to the ICMP packet transmission request signal transmitted from the entry handler 464 and transmits the ICMP packet to the sending node 20. Also, the packet handler 468 discards the relevant IP packet in response to the packet discard request signal transmitted from the field discriminator 466 and does not generate a special ICMP packet. Here, the packet handler 468 can generate an ICMP packet with reference to the erroneous IP packet received from the error detector 42. Also, the packet handler 468 processes the received IP packet normally in response to the error detection failure signal (normal process request signal) received from the error handler 42. Processing the received IP packet normally includes a process of transmitting upper layer data (for example, TCP data) to an upper layer (for example, a TCP layer of OSI 7-layer).

Operation of the error handling apparatus 40 of FIG. 7 is described below.

If the receiving node 30 receives an IP packet from the sending node 20, the error detector 42 attempts to detect an error from the received IP packet. If no error is detected, the error detector 42 transmits the received IP packet to the packet handler 468, which handles the received IP packet normally and waits for a next packet.

If the error detector 42 detects an error in the received IP packet, it transmits address information of the erroneous IP packet to the error handler 46. The entry search unit 462 of the error handler 46 searches the cache unit 44 for an object entry having the same address information as the erroneous IP packet and transmits the object entry to field discriminator 466. If the entry search unit 462 fails to locate a matching object entry, it transmits an entry generation request signal with address information of the erroneous IP packet to the entry handler 464. According to the entry generation request signal, the entry handler 464 sets the valid bit field (Valid) of an entry to 1, the error count field (Err_cnt) to 1, the first timer field (Timer A) to the maximum error detection waiting time (Ta), the second timer field (Timer B) to 0, and the SA field and the DA field to address information of the erroneous IP packet, respectively.

The field discriminator 466 judges whether the second timer field (Timer B) of the object entry is 0. If the second timer field (Timer B) is not 0, that is, if communication is inappropriate since the maximum communication discontinuation time has not lapsed, the packet handler 468 discards the erroneous IP packet and waits to receive a next IP packet. Also, the packet handler 468 does not transmit an ICMP packet to a sending node of the erroneous IP packet. On the other hand, if the second timer field (Timer B) is 0, the field discriminator 466 judges whether the first timer field (Timer A) is 0. If the first timer field (Timer A) is 0, that is, if the maximum error detection waiting time has lapsed since detection of a preceding error, the entry handler 464 deletes the object entry, and the packet handler 468 generates an ICMP packet about the relevant error and transmits the relevant ICMP packet to the sending node 20. If the first timer field (Timer A) is not 0, the field discriminator 466 judges whether the error count field (Err_cnt) is the same as the maximum allowable number of errors. If the error count field (Err_cnt) is the same as the maximum allowable number of errors, that is, if the number of consecutive error detection times is larger than an allowable value, the entry handler 464 sets the second timer field (Timer B) of the object entry to the maximum communication discontinuation time (Tb) and subtracts from the second timer field (Timer B) every unit time, sets the error count field (Err_Cnt) to 0, and sets the first timer field (Timer A) to a certain non-zero value, for example, the maximum error detection waiting time (Ta). If the error count field (Err_cnt) has not reached the maximum allowable number of errors, the entry handler 464 adds 1 to the error count field (Err_cnt) of the object entry, sets the first timer field (Timer A) to the maximum error detection waiting time (Ta) and subtracts from the first timer field (Timer A) every unit time.

As described above, in a case where the number of errors that are consecutively detected within the maximum error detection waiting time (Ta) exceeds the maximum allowable number of errors (Ecm) the error handling apparatus 40 discontinues communication with a sending node, discards erroneous IP packets, and does not generate ICMP packets, during the maximum communication discontinuation time (Tb). Also, in a case where no error is detected within the maximum error detection waiting time (Ta), the error handling apparatus 40 determines that no abnormal error generation is occurring and deletes the object entry.

In the above description, the object entry is deleted when no error is detected within the maximum error detection waiting time (Ta). However, considering cache storage ability and communication environment, in a case where an error is detected in an IP packet having the same address information as the object entry, by resetting the first timer field (Timer A) of the object entry to the maximum error detection waiting time (Ta), subtracting from the first timer field (Timer A), and setting the error count field (Err_cnt) to 0, instead of deleting the object entry, the existing entry can be used without generating a new entry.

Also, in the present embodiment, the error handling process is performed by referring to the cache unit so that only communication with an error-generating sending node is discontinued. However, considering indiscriminate packet manipulation and network-wide DoS attacks, in a case where more than a predetermined number of errors are consecutively detected within the first predetermined time, an error handler can be made up so that communication is discontinued with all sending nodes connected to the receiving node during the second predetermined time. In this case, no special cache unit is required.

An error handling method according to an exemplary embodiment of the present invention is described with reference to FIG. 8.

An IP packet is received from the sending node 20 in step S801.

Whether an error is detected in the received IP packet is determined in step S803.

If no error is detected in step S803, the IP packet is handled normally in step S805, and the error handling process is finished.

If an error is detected in step S803, whether a situation that a number of errors in object IP packets are consecutively detected, each within the maximum error detection waiting time (Ta), exceeds the maximum allowable number of errors is determined in step S807.

If the maximum allowable number of errors is exceeded as determined in step S807, communication with a sending node of the object IP packet is discontinued within the maximum communication discontinuation time, in step S809. Here, for the duration of the communication discontinuation with the sending node of the object IP packet, IP packets are still received from the relevant sending node, however erroneous IP packets are simply discarded without transmitting ICMP packets back to the sending node.

If the maximum allowable number of errors is not exceeded as determined in step S807, an ICMP packet about the relevant error is generated and transmitted to the relevant sending node in step S811.

Figure 8:
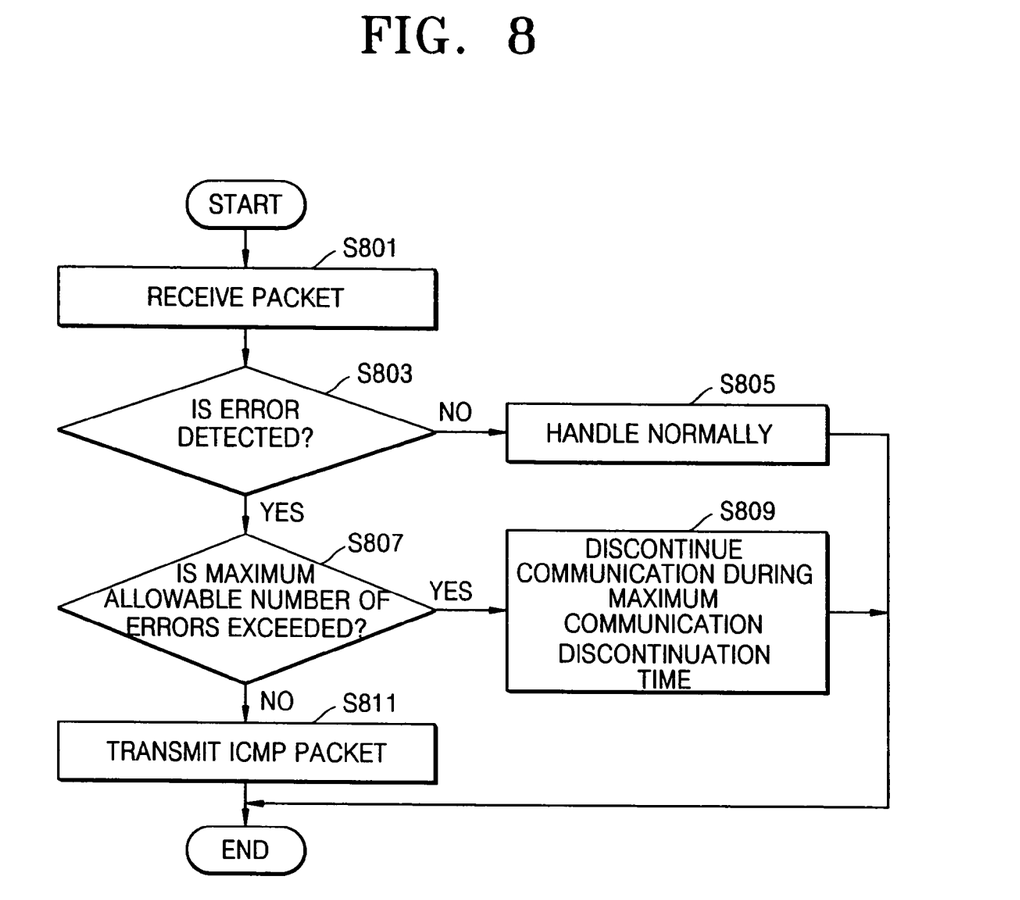
FIG. 8 is a flowchart of an error handling method according to the present invention.
Figure 9:
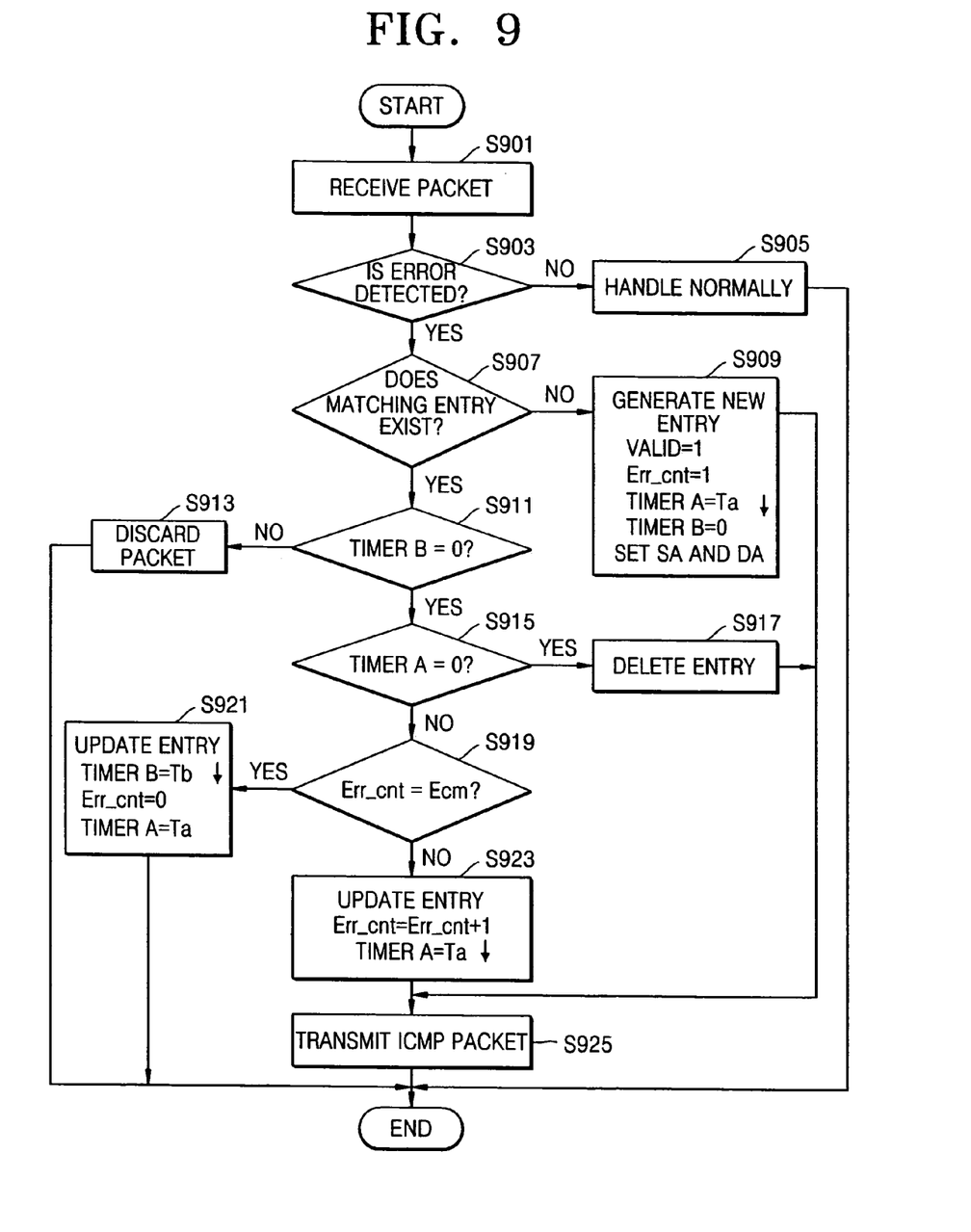
FIG. 9 is a flowchart of an error handling method using the error handling apparatus of FIG. 4.

FIG. 9 is a detailed flowchart of the error handling method of FIG. 8. To perform the error handling method of FIG. 8 for erroneous IP packets having the same address information, according to an exemplary embodiment of the present invention, the method can include generating a cache when communication starts or a first error is detected. The cache includes at least one entry like that shown in FIG. 5, and entries are distinguished from each other by address information of the address information field.

Referring to FIG. 9, an IP packet is received from the sending node 20 in step S901.

Whether an error is detected in the received IP packet is determined in step S903.

If no error is detected in step S903, the IP packet is handled normally in step S905, and a next IP packet is awaited.

Whether the cache contains an entry having the same address information as the erroneous IP packet is determined in step S907.

If no matching entry is found in step S907, a new entry for the erroneous IP packet is generated and each field of the new entry is initialized in step S909. During initialization, the valid bit field (VALID) is set to 1, the error count field (Err_cnt) is set to 1, the first timer field (Timer A) is set to the maximum error detection waiting time (Ta) and subtracted from every unit time, the second timer field (Timer B) is set to 0, and the SA field and the DA field are set to source address information and destination address information, respectively. An ICMP packet is generated and transmitted to the relevant sending node in step S925, and a next IP packet is awaited.

If a matching entry is found in step S907, whether the second timer field (Timer B) of the relevant entry is 0 is determined in step S911.

If the second timer field (Timer B) is not 0 in step S911, since the maximum communication discontinuation time (Tb) has not yet lapsed, the erroneous IP packet is discarded in step S913, and a next IP packet is awaited.

If the second timer field (Timer B) is 0 in step S911, whether the first timer field (Timer A) is 0 is determined in step S915.

If the first timer field (Timer A) is 0 in step S915, the entry is deleted in step S917, and an ICMP packet is transmitted to the relevant sending node in step S925.

If the first timer field (Timer A) is not 0 in step S915, whether the error count field (Err_cnt) has reached the maximum allowable number of errors (Ecm) is determined in step S919.

If the error count field (Err_cnt) has reached the maximum allowable number of errors (Ecm) in step S919, the entry is updated in step S921, and a next IP packet is awaited. In step S921, the second timer field (Timer B) is set to the maximum communication discontinuation time (Tb) and subtracted from every unit time, the error count field (Err_cnt) is set to 0, and the first timer field (Timer A) is set to a certain non-zero value, for example, the maximum error detection waiting time (Ta).

If the error count field (Err_cnt) has not reached the maximum allowable number of errors (Ecm) in step S919, the entry is updated in step S923, and an ICMP packet is transmitted to the relevant sending node in step S925. In step S923, the error count field (Err_cnt) is increased by 1, and the first timer field (Timer A) is reset to the maximum error detection waiting time (Ta) and subtracted from every unit time.

Figure 10:
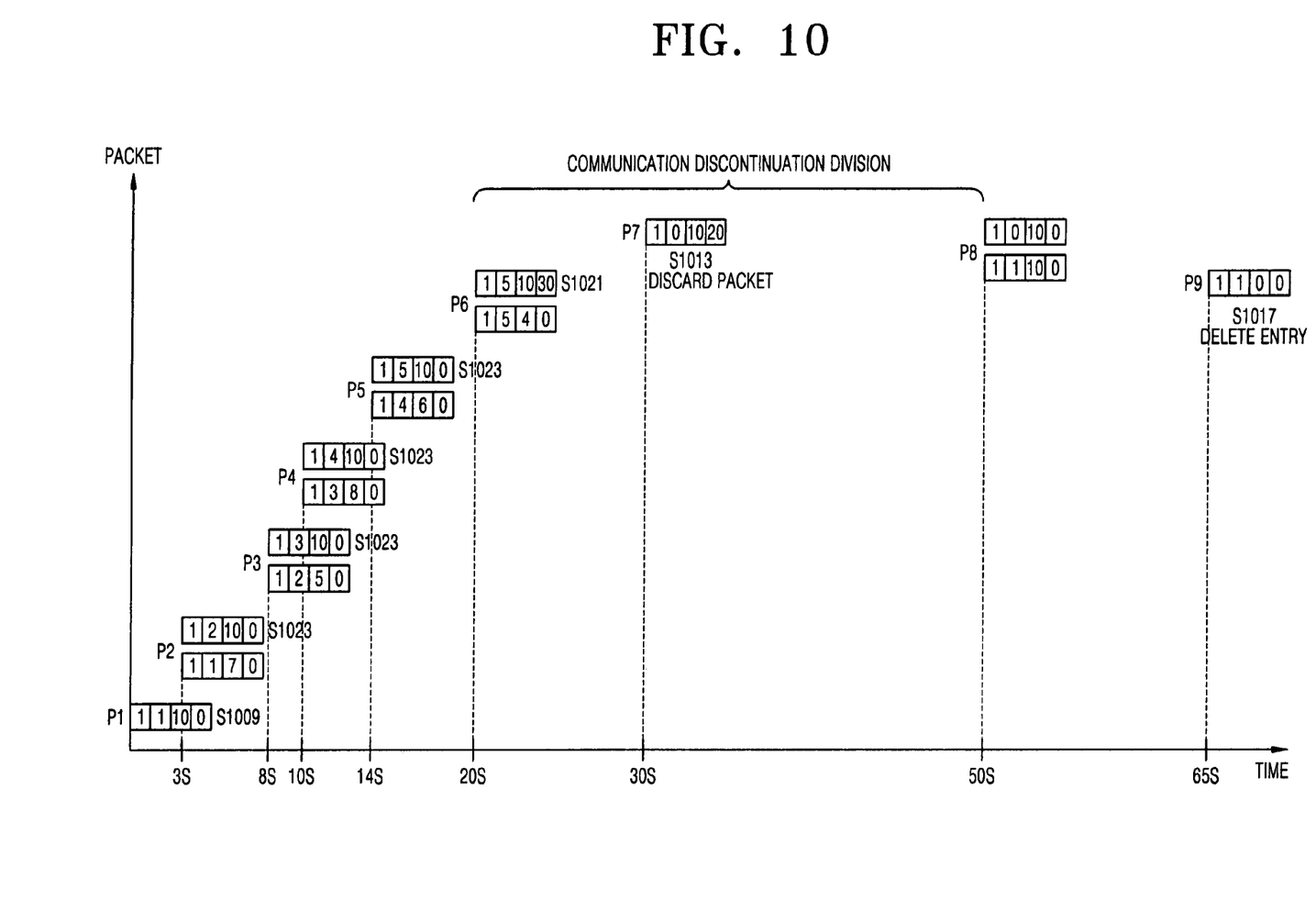
FIG. 10 is a timing diagram illustrating detailed procedures of an error handling method according to an exemplary embodiment of the present invention.

FIG. 10 is a conceptual drawing illustrating more concretely procedures of the error handling method according to the above-described embodiment of the present invention.

Here, it is assumed that the maximum allowable number of errors (Ecm) is 5, the maximum error detection waiting time (Ta) is 10 seconds, and the maximum communication discontinuation time (Tb) is 30 seconds. Also, for convenience, it is assumed that all IP packets received at a receiving node belong to the same entry. Accordingly, the SA field and the DA field are omitted in FIG. 10. Also, it is assumed that errors are detected in all received packets.

When a first erroneous packet P1 is received, since there is no entry for the packet P1, a new entry En is generated in step S1009. In step S1009, the valid bit field (VALID), the error count field (Err_cnt), the first timer field (Timer A), and the second timer field (Timer B) are set to 1, 1, 10, and 0, respectively.

If an erroneous packet P2 is received 3 seconds after the erroneous packet P1 is received, the entry En is updated from a state (1,1,7,0) to (1,2,10,0) in step S1023.

If an erroneous packet P3 is received 5 seconds after the erroneous packet P2 is received, the entry En is updated from a state (1,2,5,0) to (1,3,10,0) in step S1023.

For erroneous packets P4 and P5, since errors are detected within the maximum error detection waiting time, i.e., 10 seconds from former error generation, the error count field (Err_cnt) is increased by 1 for each erroneous packet in step S1023.

If an erroneous packet P6 is received 6 seconds after the error packet P5 is received, the entry En is updated from a state (1,5,4,0), in which the error count field (Err_cnt) is 5, which is the maximum allowable number of errors, to (1,0,10,30).

Since an erroneous packet P7 is received within 30 seconds after the erroneous packet P6 is received, the erroneous packet P7 is discarded in step S1013.

Since an erroneous packet P8 is received after the maximum communication discontinuation time of 30 seconds, the entry En is set to (1,1,10,0) in step S1023.

Also, since an erroneous packet P9 is received 15 seconds after the erroneous packet P5 is received, the maximum error detection waiting time of 10 seconds is exceeded. Therefore, the entry En, which is at a state (1,1,0,0) when the erroneous packet P9 is received, is deleted in step S1017.

An error handling method using the error handling apparatus 40 according to an exemplary embodiment of the present invention is described above. Also, the method can be executed by a computer following a computer program stored on software in a receiving node. Therefore, a computer-readable medium having recorded thereon a computer program for executing a method of the present invention is included within the scope of the present invention.

Also, it will be understood by those of ordinary skill in the art that various changes in form and details may be made to the above-described exemplary embodiments of the present invention without departing from the spirit and scope of the present invention. For example, in the above-described embodiments of the present invention, in a case where the number of errors in object IP packets that are consecutively detected, each within the maximum error detection waiting time (Ta), exceeds the maximum allowable number of errors, communication with a sending node is discontinued during the second predetermined time. However, in an alternative embodiment of the present invention, in a case where the number of errors in object IP packets that are detected within the first predetermined time exceeds a maximum allowable number of errors, communication with a sending node may be discontinued during the second predetermined time. Therefore, the true scope of the present invention should not be limited to the above-described exemplary embodiments but determined by the attached claims and their equivalents.

According to the present invention, when the number of errors that are consecutively detected, each within a maximum error detection waiting time, exceeds a maximum allowable number of errors, a network load of a receiving node can be reduced by not transmitting ICMP packets to a sending node.

Also, according to the present invention, in a case where the number of consecutively generated errors in IP packets having the same source address detected within a predetermined time exceeds a predetermined number, a network load of a receiving node can be reduced and communication efficiency can be improved by not transmitting ICMP packets to the sending node that transmitted the erroneous IP packets.

What is claimed is:

1. An IP packet error handling apparatus, which handles errors in IP packets received from at least one sending node, the apparatus comprising:
   an error detector, which detects errors in the received IP packets; and
   an error handler, which discontinues communication with the at least one sending node of the erroneous IP packets during a second predetermined time in a case where a number of errors in object IP packets that are consecutively detected, each within a first predetermined time since a previous error detection, exceeds a maximum allowable number of errors.

2. The apparatus of claim 1, wherein the error handler handles the errors in IP packets having the same address information.

3. An IP packet error handling apparatus, which handles errors in IP packets received from at least one sending node, the apparatus comprising:
   an error detector, which detects errors in the received IP packets; and an error handler, which discontinues communication with the at least one sending node of the erroneous IP packets during a second predetermined time in a case where more than a predetermined number of errors in IP packets are detected during a first predetermined time.

4. An IP packet error handling method, which handles errors in IP packets received from at least one sending node, the method comprising:
   (a) detecting errors in the received IP packets; and
   (b) discontinuing communication with a sending node of the erroneous IP packets during a second predetermined time in a case where a number of errors in object IP packets that are consecutively detected, each within a first predetermined time since a previous error detection, exceeds a maximum allowable number of errors.

5. The method of claim 4, wherein step (b) is performed for erroneous IP packets having the same address information.

6. The method of claim 4, further comprising: (c) handling the received IP packets in a normal fashion in a case where no errors are detected in step (a).

7. The method of claim 4, wherein step (b) further comprises (b1) generating a cache comprising at least one entry comprising:
- a first timer field, which is set to the first predetermined time and decreases linearly with time;
- a second timer field, which is set to the second predetermined time and decreases linearly with time;
- an error count field, which counts the number of consecutively generated errors; and
- an address information field, which represents address information of an erroneous IP packet, and matches IP packets having the same address information to the same entry, wherein step (b) is performed with reference to an entry associated with erroneous object IP packets having the same address information.

8. The method of claim 7, wherein step (b) further comprises:
(b2) searching for the associated entry in the cache;
(b3) checking statuses of fields of the associated entry;
(b4) in a case where it is found in step (b3) that the number of errors in object IP packets that are consecutively detected, each within the first predetermined time since the previous error detection, exceeds the maximum allowable number of errors, setting the second timer field of the associated entry to the second predetermined time and subtracting from the second timer field linearly with time; and
(b5) in a case where it is found in step (b3) that the second predetermined time tracked by the second timer field has not lapsed, not transmitting an ICMP packet to a sending node of the object IP packet.

9. The method of claim 8, wherein step (b) further comprises: (b6) generating a new entry associated with the object IP packet in a case where the associated entry was not found in step (b2).

10. The method of claim 8, wherein step (b) further comprises: (b6) in a case where it is found in step (b3) that the first timer field of the associated entry is 0, deleting the associated entry.

11. The method of claim 8, wherein step (b) further comprises: (b6) in a case where it is found in step (b3) that the first timer field of the associated entry is 0, setting the first timer field to the first predetermined time and subtracting from the first timer field linearly with time.

12. The method of claim 8, wherein statuses of the second timer field, the first timer field, and the error count field of the associated entry are sequentially determined in step (b3).

13. The method of claim 12, wherein step (b) further comprises:
(b6) in a case where it is found in step (b3) that the second timer field of the associated entry is 0, the first timer field of the associated entry is not 0, and the error count field of the associated entry has not reached the maximum allowable number of errors, adding 1 to the error count field of the associated entry, setting the first timer field to the first predetermined time, and subtracting from the first timer field linearly with time.

14. The method of claim 7, wherein the entry further comprises a valid bit field for representing whether the entry is used.

15. The method of claim 7, wherein the entry further comprises an internet control message protocol (ICMP) type field and an ICMP code field for respectively representing an ICMP type and an ICMP code defined in an ICMP to transmit an ICMP packet to a sending node of an erroneous IP packet.

16. The method of claim 7, wherein the address information field comprises a source address field and a destination address field for representing source address information and destination address information of an erroneous IP packet.

17. The method of claim 7, wherein in step (b), whenever the next error is detected and the first timer field of the associated entry is not 0, the error count field of the associated entry is increased by 1 and the first timer field is simultaneously set to the first predetermined time and subtracted from linearly with time, and in a case where the error count field exceeds the maximum allowable number of errors, the second timer field of the associated entry is set to the second predetermined time and subtracted from linearly with time, and in a case where an error is detected in the object IP packet received while the second timer field is not 0, an ICMP packet about the error is not transmitted to a sending node of the object IP packet.

18. An IP packet error handling method, which handles errors in IP packets received from at least one sending node, the method comprising:
(a) detecting errors in the received IP packets; and
(b) discontinuing communication with a sending node of the erroneous IP packets during a second predetermined time in a case where more than a predetermined number of errors in the IP packets are detected during a first predetermined time.

19. A computer-readable medium having recorded thereon a computer program for executing a method which handles errors in IP packets received from at least one sending node, the method comprising:
(a) detecting errors in the received IP packets; and
(b) discontinuing communication with the at least one sending node of the erroneous IP packets during a second predetermined time in a case where a number of errors in object IP packets that are consecutively detected, each within a first predetermined time since a previous error detection, exceeds a maximum allowable number of errors.

20. A computer-readable medium having recorded thereon a computer program for executing a method which handles errors in IP packets received from at least one-sending node, the method comprising:
(a) detecting errors in the received IP packets; and
(b) discontinuing communication with the at least one sending node of the erroneous IP packets during a second predetermined time in a case where more than a predetermined number of errors in the IP packets are detected during a first predetermined time.

* * * * *